US011778150B2

(12) United States Patent
Ota

(10) Patent No.: US 11,778,150 B2
(45) Date of Patent: Oct. 3, 2023

(54) IMAGE SUPPLY DEVICE, DISPLAY SYSTEM, AND METHOD FOR DIRECT DISPLAY OF SECOND IMAGE

(71) Applicant: SEIKO EPSON CORPORATION, Tokyo (JP)

(72) Inventor: Susumu Ota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/361,455

(22) Filed: Jun. 29, 2021

(65) Prior Publication Data
US 2022/0006986 A1 Jan. 6, 2022

(30) Foreign Application Priority Data
Jul. 3, 2020 (JP) .................................. 2020-115460

(51) Int. Cl.
H04N 9/31 (2006.01)
G06T 5/00 (2006.01)
G06F 3/14 (2006.01)
G06T 3/00 (2006.01)

(52) U.S. Cl.
CPC ............. *H04N 9/3179* (2013.01); *G06F 3/14* (2013.01); *G06T 3/0093* (2013.01); *G06T 5/002* (2013.01); *G06T 2200/32* (2013.01)

(58) Field of Classification Search
None
See application file for complete search history.

(56) References Cited

U.S. PATENT DOCUMENTS

| 5,664,216 A * | 9/1997 | Blumenau ................. G06F 8/34 715/967 |
| 9,514,333 B1 * | 12/2016 | Patel .................... G06F 21/6245 |
| 9,691,361 B2 * | 6/2017 | Basson ..................... G09G 5/37 |
| 10,331,394 B1 * | 6/2019 | Sarfi ..................... G06F 9/4411 |
| 2005/0086515 A1 * | 4/2005 | Paris ..................... G06F 21/554 726/26 |
| 2012/0105317 A1 * | 5/2012 | Oka .................... H04M 1/0202 345/1.1 |
| 2015/0033149 A1 * | 1/2015 | Kuchoor ............ H04N 21/4782 715/753 |
| 2015/0278534 A1 * | 10/2015 | Thiyagarajan .......... G06F 21/84 726/28 |

(Continued)

FOREIGN PATENT DOCUMENTS

| JP | 2011-191674 A | 9/2011 |
| JP | 2013-20058 A | 1/2013 |
| JP | 2019-132955 A | 8/2019 |

OTHER PUBLICATIONS

Eizoglobal.com, Monitor Basics—The Technology to Use "Multiple Displays" Makes Windows 10 More Convenient—5 pages.

Primary Examiner — Jason A Pringle-Parker
(74) Attorney, Agent, or Firm — Dority & Manning, P.A.

(57) ABSTRACT

A personal computer includes an output interface configured to output an image signal to a projector, an image processing section configured to generate a second image obtained by reducing visibility of the first image, and a second control section configured to, when a first condition is satisfied, cause the output interface to output a second image signal based on the second image and, when a second condition is satisfied, cause the output interface to output a first image signal based on the first image.

11 Claims, 11 Drawing Sheets

(56) References Cited

U.S. PATENT DOCUMENTS

| | | | | |
|---|---|---|---|---|
| 2015/0332439 A1* | 11/2015 | Zhang | ................... | G06V 20/52 345/647 |
| 2017/0048245 A1* | 2/2017 | Owen | ................ | G06F 21/6227 |
| 2018/0336373 A1* | 11/2018 | Deenadayal | ............ | G06F 21/10 |

* cited by examiner

IMAGE SUPPLY DEVICE, DISPLAY SYSTEM, AND METHOD FOR DIRECT DISPLAY OF SECOND IMAGE

The present application is based on, and claims priority from JP Application Serial Number 2020-115460, filed Jul. 3, 2020, the disclosure of which is hereby incorporated by reference herein in its entirety.

BACKGROUND

1. Technical Field

The present disclosure relates to an image supply device, a display system, and an image output method.

2. Related Art

There has been known a technique for preventing a display device from displaying information that a user does not desire to make public (see, for example, JP-A-2011-191674 (Patent Literature 1)). In the technique described in Patent Literature 1, an imaging device including a monitor is capable of outputting an image to an external display device. The imaging device displays the image on the monitor before outputting the image to the display device. The user performs publication setting for the displayed image. The imaging device stores the image, for which the publication setting is performed, in a publication-image storing section and outputs the image stored in the publication-image storing section to the display device.

When an image supply device that outputs an image signal is coupled to the display device and the display device performs display based on an image signal, it is not easy to individually set, before the display, whether to make public an image output by the image supply device. A method of preventing display of an image not desired to be made public in such a case has not been proposed.

SUMMARY

An aspect of the present disclosure is directed to an image supply device that outputs an image signal, the image supply device including: an interface circuit configured to output the image signal to a display device different from the image supply device; an integrated circuit configured to generate a second image obtained by reducing visibility of the first image; and a processor programmed to, when a first condition is satisfied, cause the interface circuit to output a second image signal based on the second image and, when a second condition is satisfied, cause the interface circuit to output a first image signal based on the first image.

Another aspect of the present disclosure is directed to a display system including: a display device including a display section; and an image supply device configured to output an image signal to the display device. The image supply device includes: an interface circuit configured to output the image signal to the display device; an integrated circuit configured to generate a second image obtained by reducing visibility of the first image; and a processor programmed to, when a first condition is satisfied, cause the interface circuit to output a second image signal based on the second image and, when a second condition is satisfied, cause the interface circuit to output a first image signal based on the first image.

Still another aspect of the present disclosure is directed to an image output method including: generating a second image obtained by reducing visibility of the first image; outputting a second image signal based on the second image when a first condition is satisfied; and, outputting a first image signal based on the first image when a second condition is satisfied.

DESCRIPTION OF EXEMPLARY EMBODIMENTS

Embodiments are explained below with reference to the drawings.

1. First Embodiment 1-1. Configuration of a Display System
FIG. 1 is a diagram showing an example of the configuration of a display system 1.

The display system 1 includes a display device and a personal computer 200. In a first embodiment, a projector 100 is explained as an example of the display device.

The projector 100 is capable of being coupled to external devices that output image information. These devices are called image supply device. The projector 100 projects image light PL onto a screen SC based on the image information output from the image supply device. Consequently, a projected image P is displayed on the screen SC. The operation of the projector 100 projecting the image light PL is referred to as display in the following explanation.

Figure 1:
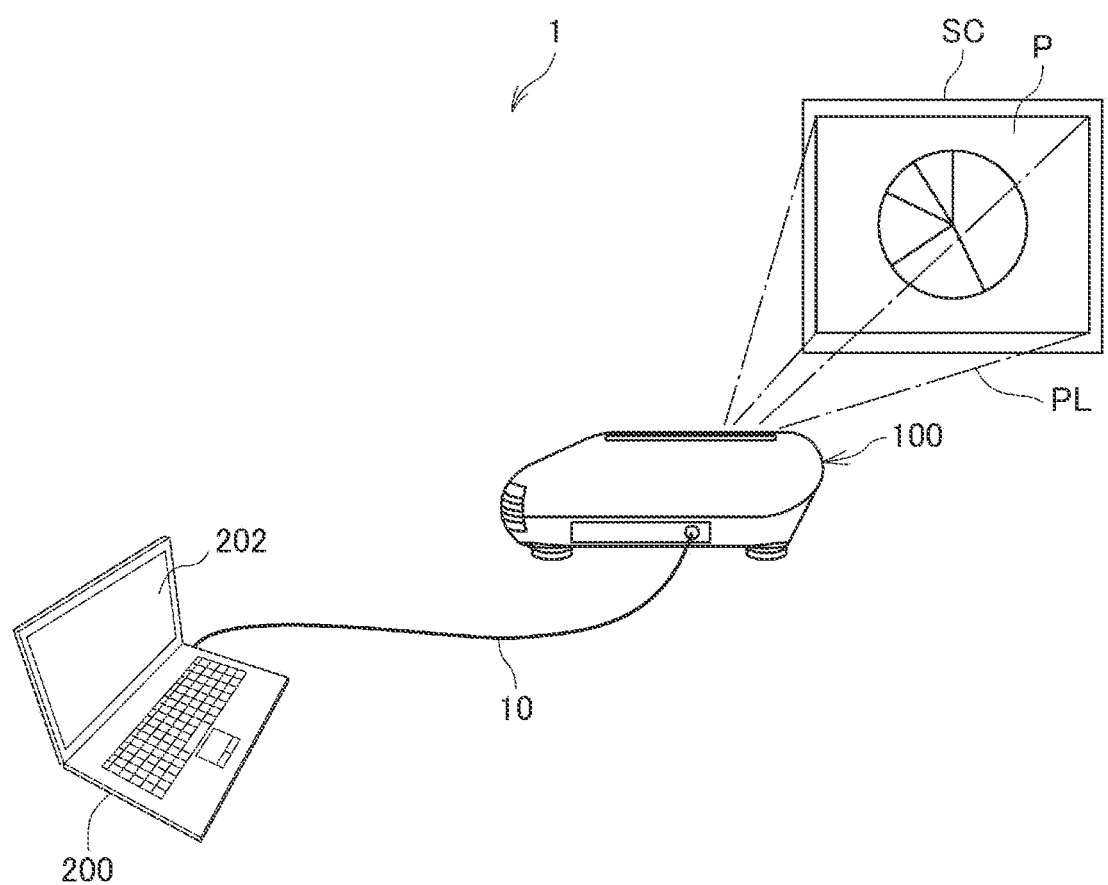
FIG. 1 is a diagram showing an example of the configuration of a display system.

In FIG. 1, an example is shown in which the personal computer 200 is coupled to the projector 100 as the image supply device. The personal computer 200 is coupled to the projector 100 by, for example, a cable 10. The cable 10 is, for example, an HDMI (High-Definition Multimedia Interface) cable conforming to an HDMI standard. In this configuration, the personal computer 200 executes communication conforming to the HDMI standard with the projector 100 and transmits data including image information and control data to the projector 100. A configuration may be adopted in which the projector 100 and the personal computer 200 are coupled by wireless communication and wirelessly transmit the data including the image information. HDMI is a registered trademark.

In FIG. 1, an example of floor installation for placing the projector 100 on a floor in front of the screen SC is shown. However, the projector 100 may be suspended from a ceiling and set. In this embodiment, as an example, the projector 100 projects the image light PL onto a plane screen SC. However, a projection target is not limited to the screen SC and may be a plane such as a wall surface of a building or may be a curved surface or an uneven surface.

1-2. Configuration of the Projector

Figure 2:
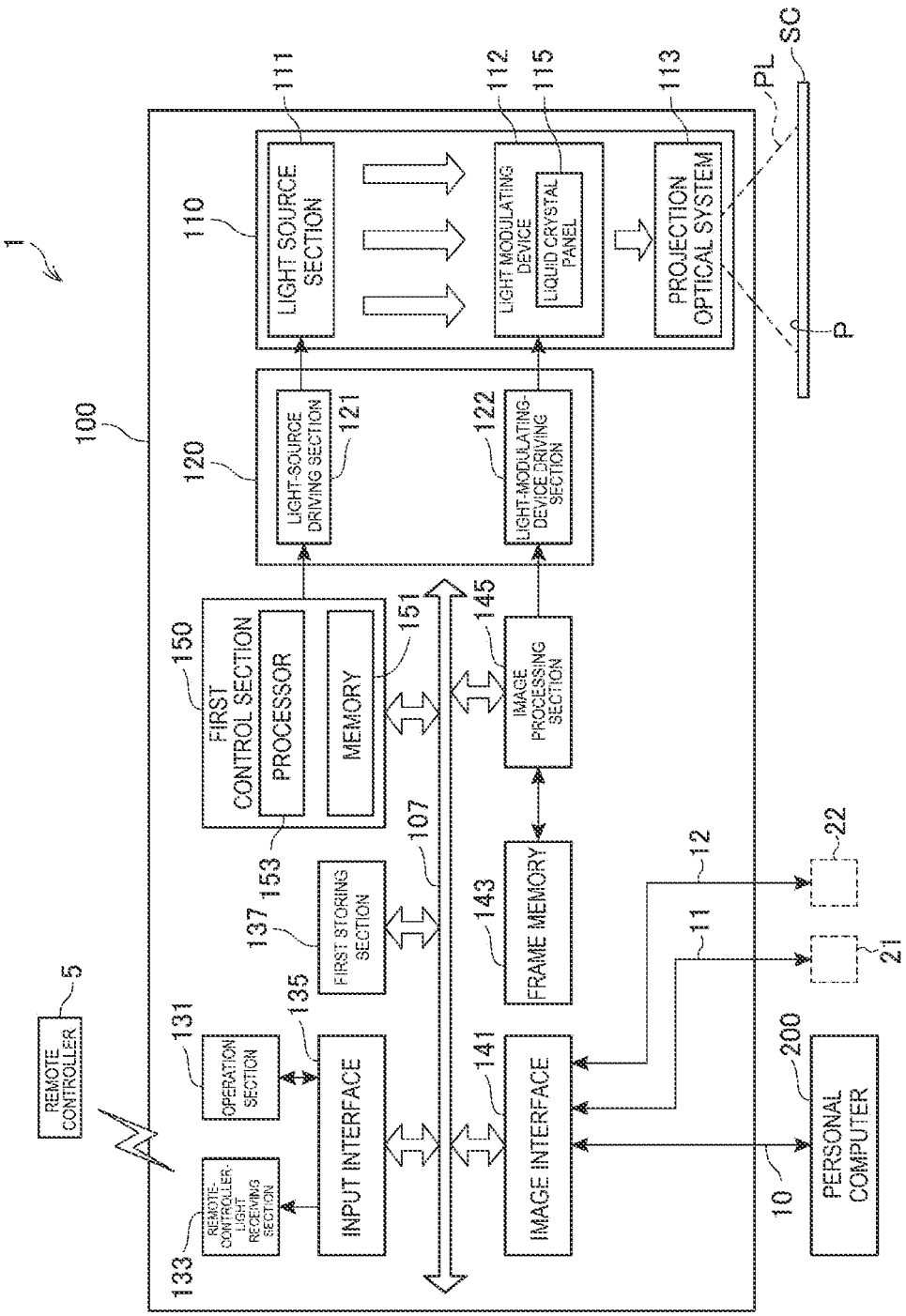
FIG. 2 is a block diagram of a projector.

FIG. 2 is a diagram showing an example of the configuration of the projector 100 according to this embodiment.

The projector 100 includes a projecting section 110 and a driving section 120 that drives the projecting section 110. The projecting section 110 forms an optical image and projects the image onto the screen SC to display the image on the screen SC.

The projecting section 110 includes a light source section 111, a light modulating device 112, and a projection optical system 113. The driving section 120 includes a light-source driving section 121 and a light-modulating-device driving section 122. The projecting section 110 corresponds to an example of the display section.

The light source section 111 includes a lamp such as a halogen lamp, a xenon lamp, or an ultra-high pressure mercury lamp or a solid-state light source such as an LED (Light Emitting Diode) or a laser light source. The light source section 111 may include a reflector that guides light emitted by a light source to the light modulating device 112 and an auxiliary reflector. Further, the light source section 111 may include a lens group and a polarizing plate for improving an optical characteristic of projected light or a dimming element or the like for reducing, on a path leading to the light modulating device 112, a light amount of the light emitted by the light source. The light-source driving section 121 lights and extinguishes the light source of the light source section 111 according to an instruction of a first control section 150.

The light modulating device 112 includes a light modulating element and modulates the light emitted by the light source section 111 to generate the image light PL. The light modulating device 112 includes, as the light modulating element, for example, three liquid crystal panels 115 corresponding to the three primary colors of R, G, and B. The liquid crystal panels 115 may be transmission-type liquid crystal panels or may be reflection-type liquid crystal panels. The light emitted by the light source section 111 is separated into, for example, color lights of the three colors of R, G, and B and made incident on the liquid crystal panels 115 corresponding to the color lights of R, G, and B and modulated. The color lights are combined into the image light PL by a combination optical system such as a cross dichroic prism. The image light PL is emitted to the projection optical system 113. The light modulating element included in the light modulating device 112 is not limited and may be, for example, a digital micromirror device.

The light modulating device 112 is driven by the light-modulating-device driving section 122. The light-modulating-device driving section 122 is coupled to an image processing section 145. Image data corresponding to the primary colors of R, G, and B are input to the light-modulating-device driving section 122 from the image processing section 145. The light-modulating-device driving section 122 converts the input image data into a signal suitable for the operation of the liquid crystal panels 115. The light-modulating-device driving section 122 applies a voltage to the liquid crystal panels 115 based on the converted signal and draws images on the liquid crystal panels 115.

The projection optical system 113 includes a lens, a mirror, and the like for focusing the incident image light PL on the screen SC. The projection optical system 113 may include a zoom mechanism for enlarging or reducing an image projected onto the screen SC and a focus adjusting mechanism for performing adjustment of a focus.

The projector 100 further includes an operation section 131, a remote-controller-light receiving section 133, an input interface 135, a first storing section 137, an image interface 141, a frame memory 143, an image processing section 145, and a first control section 150. These sections are coupled to one another via an internal bus 107 to be capable of performing data communication.

The operation section 131 includes not-shown operators such as buttons and switches provided on a housing of the projector 100. The operation section 131 receives operation on the operators, generates an operation signal corresponding to the operation, and outputs the operation signal to the input interface 135. The input interface 135 outputs the operation signal input from the operation section 131 to the first control section 150.

The remote-controller-light receiving section 133 receives an infrared signal transmitted from a remote controller 5 and decodes the received infrared signal to generate an operation signal. The remote-controller-light receiving section 133 outputs the generated operation signal to the input interface 135. The input interface 135 outputs the operation signal input from the remote-controller-light receiving section 133 to the first control section 150.

The first storing section 137 is a nonvolatile storage device such as a hard disk drive or an SSD (Solid State Drive). The first storing section 137 stores a program to be executed by a processor 153 explained below and data to be processed by the processor 153.

The image interface 141 includes a connector and an interface circuit and is coupled to an image supply device different from the projector 100.

In this embodiment, the image interface 141 includes an HDMI connector and an HDMI interface circuit. The image interface 141 executes communication between the image interface 141 and the personal computer 200 via the cable 10 according to the HDMI standard.

The image interface 141 may include a plurality of connectors and a plurality of interface circuits. For example, cables 11 and 12 may be capable of being coupled to the image interface 141 besides the cable 10. As the cables 11 and 12, a USB (Universal Serial Bus) cable, a VGA cable, an Ethernet (registered trademark) cable, and the like can be adopted. For example, the image interface 141 may be capable of being coupled to image supply devices 21 and 22 via the cables 11 and 12. In this case, image signals can be input to the image interface 141 from each of the image supply devices 21 and 22. The image interface 141 may include a communication interface circuit that executes data communication conforming to a communication standard such as Ethernet.

The image supply device capable of being coupled to the image interface 141 only has to be a device that outputs an image signal. Examples of the image supply device include a recording medium playing device such as a DVD player, a media streaming device that acquires data via a communication line and outputs digital image data based on the acquired data, and a communication terminal device such as a smartphone. Types and the number of image supply devices capable of being coupled to the image interface 141 are not limited.

The image interface 141 may have a function of a card reader that reads image data from a portable recording medium such as an SD (registered trademark) card. The image interface 141 may include a wireless communication interface circuit that executes wireless data communication. In this case, the image interface 141 can acquire image data from the personal computer 200, the image supply devices 21 and 22 or other devices by wireless communication.

Apparatuses and devices that supply image signals to the image interface 141 are referred to as image source. When the image interface 141 is capable of using a plurality of image sources, the projector 100 is capable of selecting any one of the plurality of image sources. The first control section 150 may automatically perform the selection of the image source. For example, when priority of the respective image sources is decided in advance, the first control section 150 selects one image source according to the priority. The first control section 150 may select an image source according to operation received by the operation section 131 or operation performed using the remote controller 5.

The image interface 141 may include a connector to which a cable for transmitting an analog image signal is capable of being coupled and an interface circuit to which the analog image signal can be input. In this case, the image interface 141 includes a conversion circuit that converts the analog image signal into digital image data.

The image interface 141 selects an image source according to control by the first control section 150 and outputs data based on an image signal input from the selected image source to the image processing section 145. In the following explanation, the personal computer 200 is coupled to the image interface 141 via the cable 10. An image signal output by the personal computer 200 is an image source.

The first control section 150 includes a memory 151 and a processor 153.

The memory 151 is a storage device that stores a program to be executed by the processor 153 and data. The memory 151 is configured by a magnetic storage device, a semiconductor storage element such as a flash ROM (Read Only Memory), or a storage device of another type. The memory 151 may include a RAM (Random Access Memory) configuring a work area of the processor 153. The memory 151 stores data to be processed by the first control section 150 and a control program to be executed by the processor 153.

The processor 153 may be configured by a single processor. A plurality of processors may be configured to function as the processor 153. The processor 153 executes the control program to control the sections of the projector 100. For example, the processor 153 selects, out of the image sources coupled to the image interface 141, an image source that outputs an image to be displayed. The processor 153 controls the image interface 141 to output image data input from the image source to the image processing section 145. The processor 153 outputs an execution instruction for image processing and parameters used for the image processing to the image processing section 145. The parameters include, for example, a geometrical correction parameter for correcting geometrical distortion of an image projected onto the screen SC. Consequently, the first control section 150 executes, with the image processing section 145, various kinds of image processing on image data selected as an image source. The processor 153 controls the light-source driving section 121 to control lighting and extinction of the light source section 111 and adjusts the luminance of the light source section 111.

The image processing section 145 and the frame memory 143 can be configured by, for example, an integrated circuit. The integrated circuit includes an LSI, an ASIC (Application Specific Integrated Circuit), and a PLD (Programmable Logic Device). For example, an FPGA (Field-Programmable Gate Array) is included in the PLD. An analog circuit may be included in a part of the configuration of the integrated circuit. The image processing section 145 and the frame memory 143 may be a combination of a processor and an integrated circuit. The combination of the processor and the integrated circuit is called microcontroller (MCU), SoC (System-on-a-chip), system LSI, chip set, and the like.

The image processing section 145 develops the image data input from the image interface 141 in the frame memory 143. The frame memory 143 includes a plurality of banks. The banks have a storage capacity enough for writing image data for one frame. The frame memory 143 is configured by, for example, an SDRAM (Synchronous Dynamic Random Access Memory).

The image processing section 145 performs, on the image data developed in the frame memory 143, image processing such as resolution conversion processing, resize processing, correction of distortion aberration, shape correction processing, digital zoom processing, adjustment of the tint and the luminance of an image, or luminance adjustment.

1-3. Configuration of the Personal Computer

Figure 3:
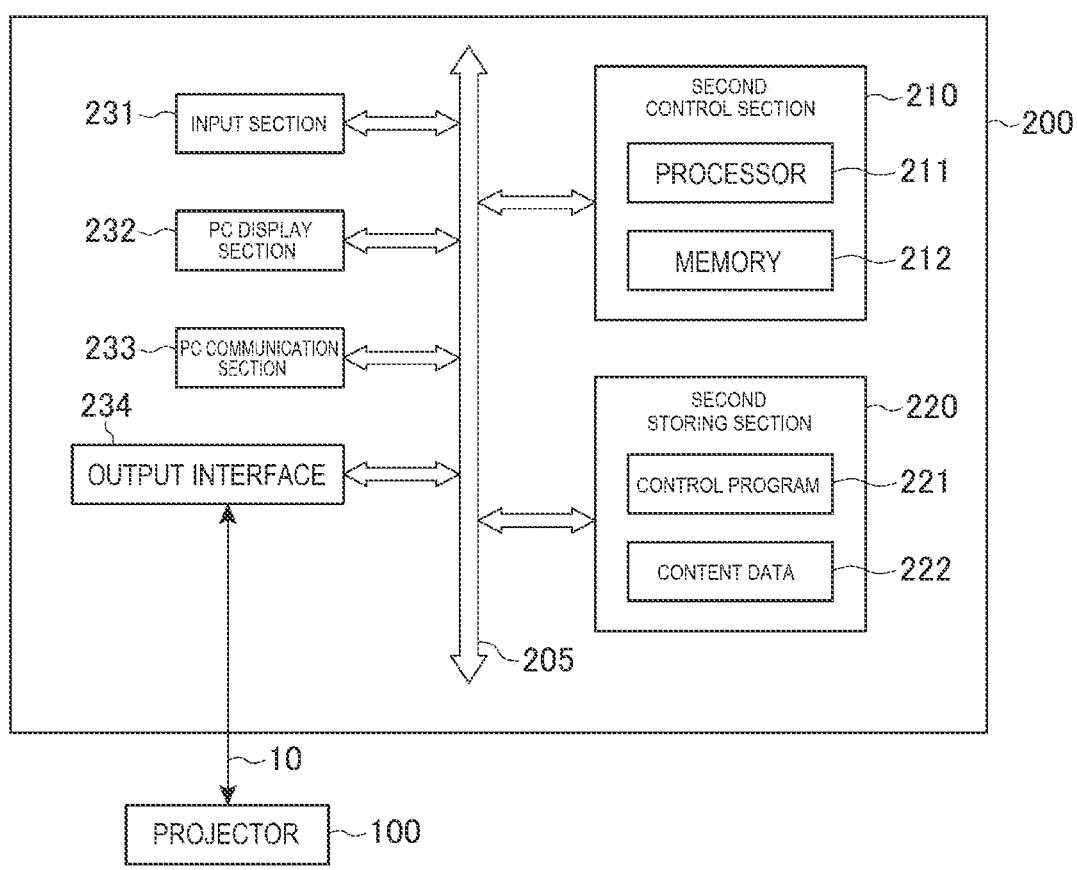
FIG. 3 is a block diagram of a personal computer.

FIG. 3 is a block diagram showing the configuration of the personal computer 200.

The personal computer 200 is a general-purpose computer of a desktop type, a laptop type, or a tablet type.

The personal computer 200 includes a second control section 210 and a second storing section 220.

The processor 211 executes a program to thereby execute data processing and controls sections of the personal computer 200.

The second control section 210 includes a processor 211 and a memory 212. The memory 212 is a storage device that stores a basic control program to be executed by the processor 211 and data. The memory 212 is configured by a magnetic storage device, a semiconductor storage element such as a flash ROM, or a storage device of another type. The memory 212 may include a RAM configuring a work area of the processor 211. The second control section 210 corresponds to an example of the control section according to the present disclosure.

The second storing section 220 is a nonvolatile storage device such as a hard disk drive or an SSD. The second storing section 220 stores a program to be executed by the processor 211 and data to be processed by the processor 211. The second storing section 220 stores a control program 221 to be executed by the processor 211 and content data 222. The content data 222 is data of contents including videos, still images, sound, and texts. For example, the personal computer 200 reproduces the content data 222 to thereby display a video and a still image on a PC display section 232. A data format of the content data 222 is not limited. The content data 222 may be data processed by a specific application program executed by the processor 211.

The personal computer 200 includes an input section 231, a PC display section 232, a PC communication section 233, and an output interface 234. These sections are coupled to the second control section 210 by a bus 205.

The input section 231 includes a not-shown input device such as a keyboard, a mouse, or a trackpad and receives operation on the input device. The input section 231 detects the operation on the input device, generates operation data indicating the detected operation, and outputs the operation data to the second control section 210. The input section 231 corresponds to an example of the reception section.

The PC display section 232 includes a display screen such as a liquid crystal panel and displays various screens according to control by the second control section 210.

The PC communication section 233 includes a connector and a communication interface circuit to which a communication cable conforming to the Ethernet standard is connectable. The PC communication section 233 executes data communication between the PC communication section 233 and external devices. The PC communication section 233 may include a wireless communication interface conforming to a Wi-Fi (registered trademark) standard. The PC communication section 233 corresponds to an example of the receiving section.

The output interface 234 outputs an image signal to devices on the outside of the personal computer 200 according to the control by the second control section 210. The image signal may be either digital image data or an analog image signal. In this embodiment, the image signal indicates the digital image data. The output interface 234 includes a connector and an interface circuit to which an image transmission cable such as the cable 10 is connectable. The output interface 234 may include a wireless communication interface that wirelessly transmits the image data. In this embodiment, the cable 10 is connected to the output interface 234. The output interface 234 outputs the image signal to the projector 100. The output interface 234 corresponds to an example of the image output section.

Figure 4:
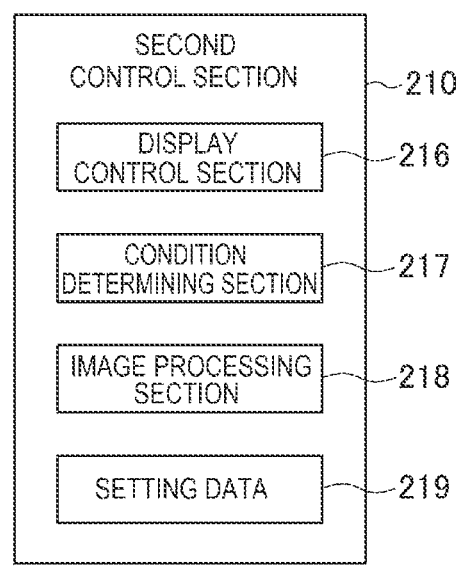
FIG. 4 is a functional block diagram of a control system of the personal computer.

FIG. 4 is a functional block diagram of a control system of the personal computer 200 and shows a functional configuration of the second control section 210. The processor 211 executes a control program to thereby function as a display control section 216, a condition determining section 217, and an image processing section 218.

The display control section 216 controls, based on, for example, input operation received by the input section 231, display of an image on the PC display section 232 and the output of an image signal from the output interface 234. For example, the second control section 210 executes data processing based on operation data input from the input section 231 and/or data received by the PC communication section 233. The display control section 216 causes the PC display section 232 to display a processing result or the like. The display control section 216 generates display data for displaying the processing result and controls the PC display section 232 to display a screen including the processing result.

For example, the display control section 216 performs processing for reproducing the content data 222 stored by the second storing section 220 and processing for causing the PC display section 232 to display an image of the content data 222 and causes the output interface 234 to output an image signal for displaying the image of the content data 222.

The display control section 216 can cause both of the PC display section 232 and the display device coupled to the output interface 234 to display an image. That is, the display control section 216 uses two display devices, that is, the PC display section 232 and the projector 100. As a state of use of the two display devices, the display control section 216 switches and executes two different display modes.

The display control section 216 is capable of switching a mirroring mode and an extension mode. The mirroring mode is an operation mode for causing the projector 100 to display the same content as content displayed on the PC display section 232. A state in which display is the same includes a state in which processing for correcting display resolutions and color tones of the PC display section 232 and the projector 100 is applied.

The extension mode is an operation mode in which the display control section 216 causes the PC display section 232 and the projector 100 to display different content. In the extension mode, the display control section 216 can use the projector 100 as a second display section that extends a display region of the PC display section 232. As an example of use of the extension mode, the display control section 216 causes the PC display section 232 to display a screen concerning basic functions of the projector 100 and causes the projector 100 to display a screen of a specific application program executed by the second control section 210. In this case, there is an advantage that a user who operates the personal computer 200 can use a large display region as if the display region of the PC display section 232 is extended by the projector 100.

The mirroring mode corresponds to the first operation state and the extension mode corresponds to the second operation state.

The display control section 216 may include, in an image signal output from the output interface 234 to the projector 100, data capable of distinguishing whether the personal computer 200 is in the mirroring mode or in the extension mode.

The condition determining section 217 determines whether an operation state of the personal computer 200 and an operation state of the projector 100 satisfy a predetermined condition. The condition determined by the condition determining section 217 is included in setting data 219. In this embodiment, the condition determining section 217 determines an output condition and an image change condition.

The output condition is a condition for starting the output of an image signal of the content data 222 or the like from the output interface 234. The image change condition is a condition for changing an image indicated by the image signal output from the output interface 234. The setting data 219 includes data for deciding contents of the output condition and the image change condition determined by the condition determining section 217. The output condition corresponds to an example of the first condition and the image change condition corresponds to an example of the second condition.

The image processing section 218 executes image processing, generates image data for display, and generates, based on the generated image data, an image signal output from the output interface 234. The PC display section 232 may perform display based on the image signal generated by the image processing section 218.

For example, when causing the projector 100 to display an image based on the content data 222 according to the control by the display control section 216, the image processing section 218 generates an image signal for displaying the image based on the content data 222. For example, when executing the mirroring mode according to the control by the display control section 216, the image processing section 218 generates an image signal for the display control section 216 to cause the projector 100 to display the same screen as a screen displayed on the PC display section 232.

The image processing section 218 acquires data of an image that the display control section 216 causes an external display device to display such as image data generated by the display control section 216 and the content data 222 selected by the display control section 216. The image acquired by the image processing section 218 is an image that should be originally displayed by the display device and is hereinafter referred to as first image. The image processing section 218 generates an image signal for displaying the first image and causes the output interface 234 to output the image signal.

Further, the image processing section 218 performs processing for processing the first image to generate a second image. The second image is an image generated from the first image and is an image different from the first image. Specifically, the second image is an image obtained by applying image processing for reducing visibility to the first image. When the second image is generated, the image processing section 218 causes the output interface 234 to output an image signal for displaying the second image.

The image processing section 218 can switch the image signal for displaying the first image before the image processing and the image signal for displaying the second image and cause the output interface 234 to output the image signal.

The setting data 219 includes information for designating a type of the image processing executed by the image processing section 218 when generating the second image and parameters of the image processing.

1-4. Image Processing

Figure 5:
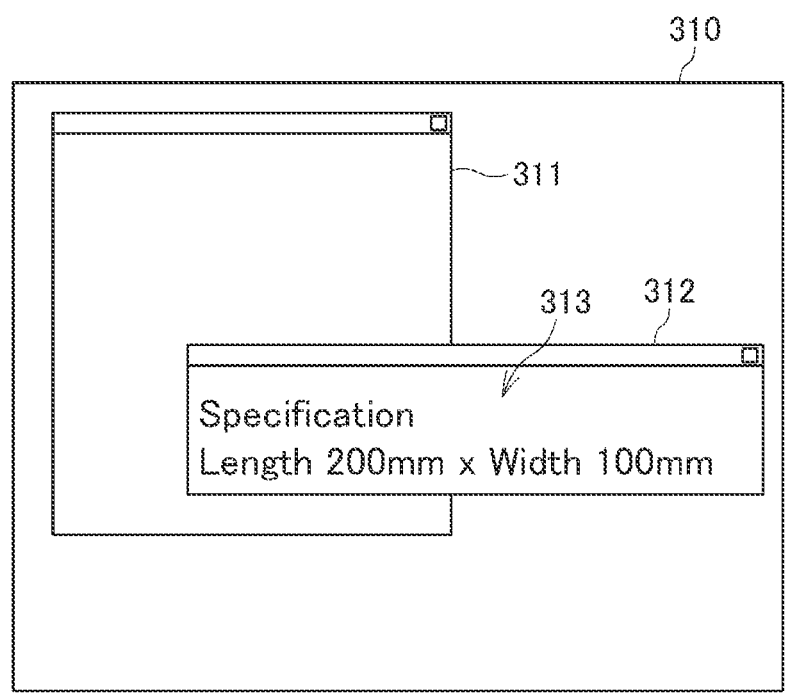
FIG. 5 is a diagram showing an example of a first image.
Figure 6:
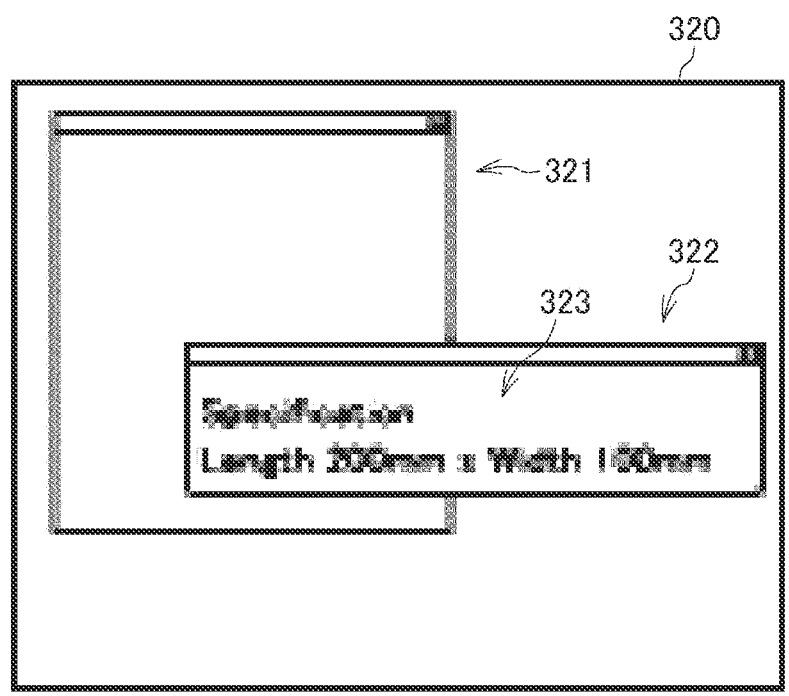
FIG. 6 is a diagram showing an example of a second image.
Figure 7:
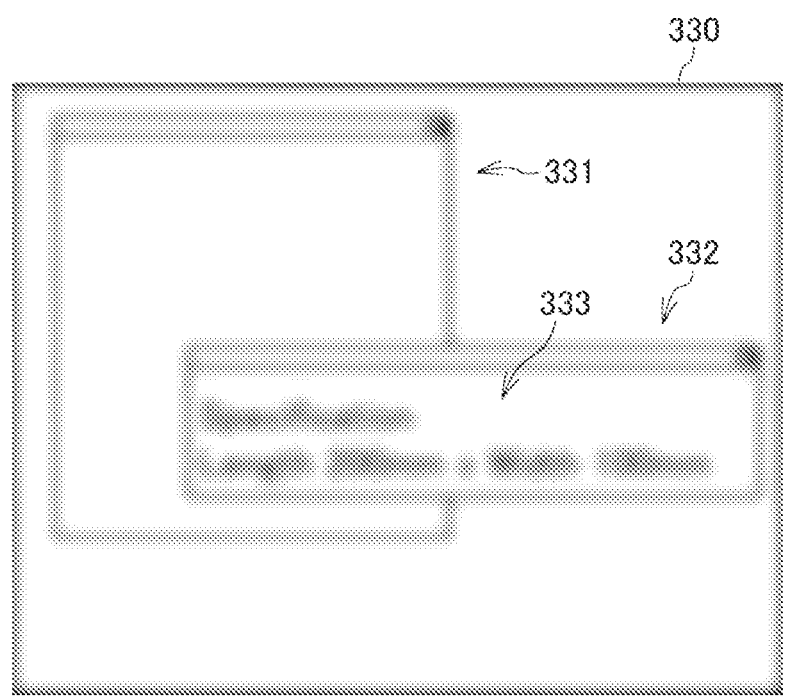
FIG. 7 is a diagram showing another example of the second image.
Figure 8:
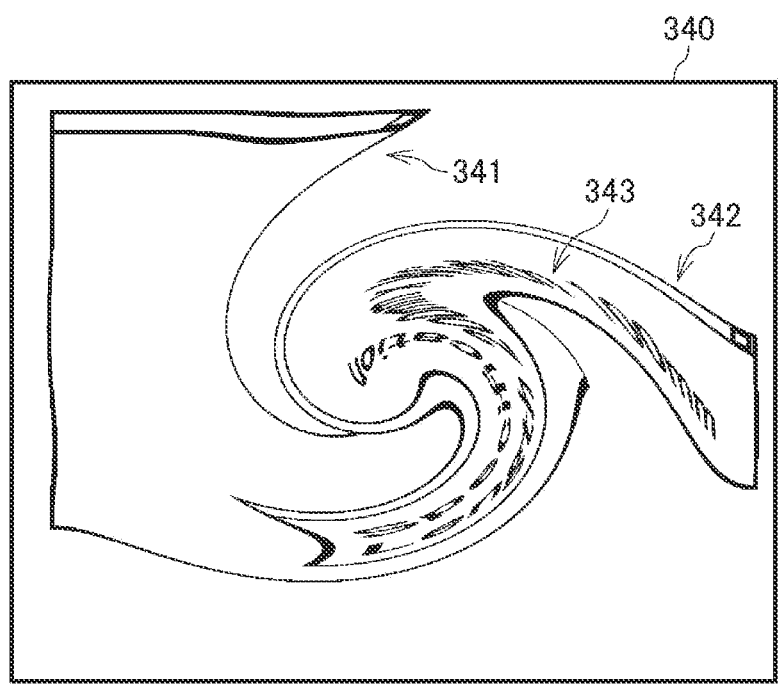
FIG. 8 is a diagram showing still another example of the second image.

FIG. 5 shows an example of the first image generated by the personal computer 200. FIGS. 6, 7, and 8 show examples of the second image generated by the personal computer 200. The first image and the second image are explained with reference to these figures.

Examples of the image processing for generating the second image from the first image include mosaic processing, shading processing, and warping processing.

The mosaic processing is image processing for setting a rectangle having any size in the first image and painting out pixels present in a range of the rectangle in the same color.

A first image 310 includes display objects 311, 312, and 313. The display objects 311 and 312 are display objects having rectangular frames and are, for example, windows displayed by an operating system of the personal computer 200. The display object 313 is a text arranged in the frame of the display object 312.

The first image 310 is an image having predetermined resolution and is formed by a plurality of pixels arranged side by side in the longitudinal direction and the lateral direction. The resolution of the first image 310 is optional. For example, the image processing section 218 adjusts the resolution of an image according to the display resolution of the liquid crystal panels 115 and generates the first image 310. In the following explanation, a color of the pixels forming the first image 310 can be rewarded as color data of the pixels or can be rewarded as a gradation value of the pixels.

A second image 320 is shown in FIG. 6 as an example of an image generated by the mosaic processing.

The second image 320 is an image generated by applying the mosaic processing to the entire first image 310. The mosaic processing is processing for arranging a rectangle including a plurality of pixels in a part of or the entire first image 310 and changing colors of the pixels included in the rectangle to the same color. When the mosaic processing is applied to the entire first image 310, the image processing section 218 divides the first image 310 into a plurality of rectangles and changes colors of pixels included in the rectangles to the same color. As the number of pixels included in the rectangles is larger, the intensity of the mosaic processing increases and the visibility of the second image 320 decreases. The first control section 150 may determine the color of the rectangles based on an average of color data of the pixels included in the rectangles. The color of the rectangles may be a color of a specific pixel included in the rectangles or may be set by the setting data 219 in advance. The number of pixels included in the rectangles may also be set by the setting data 219 in advance.

Since the mosaic processing is applied to the second image 320, the contours of display objects 321, 322, and 323 are blurred. For example, characters included in the display object 323 subjected to the mosaic processing are images hard to be read.

A second image 330 is shown in FIG. 7 as an example of an image generated by the shading processing.

The second image 330 is an image generated by applying the shading processing to the entire first image 310. The shading processing is processing for converting the color of the specific pixel forming the first image 310 based on the color of the specific pixel and a color of pixels located around the specific pixel. The conversion processing is, for example, processing for reducing a difference between the colors. Specifically, the color of the specific pixel is replaced with an average of pixel values of the pixels around the specific pixel by the conversion processing. In this case, when the average is calculated, an arithmetic operation for changing weight according to the distance between the specific pixel and the pixels around the specific pixel may be performed. Alternatively, the color of the specific pixel may be converted into a median of the pixel values around the specific pixel by the conversion processing. In the shading processing, as the number of peripheral pixels used for the conversion processing is larger, the intensity of the shading processing increases and the visibility of the second image 330 is further deteriorated.

The shading processing is called smoothing processing or blur processing as well. The shading processing can be executed by, for example, filtering performed using a filter for smoothing the color of the pixels. Parameters such as the position of the specific pixel, the number of peripheral pixels, a degree of smoothing, and the number of times of repetition of the shading processing in the shading processing may be determined based on the color of the specific pixel and an average of the colors of the plurality of pixels included in the first image 310. The parameters may be set in advance by the setting data 219. The personal computer 200 may repeatedly apply the shading processing to the image subjected to the shading processing.

The second image 330 is an image generated by performing the shading processing by setting all pixels forming the first image 310 as specific pixels or arranging the specific pixel for each predetermined number of pixels. Since the shading processing is applied to the second image 330, the contours of the display objects 331, 332, and 333 are blurred. For example, characters included in the display object 333 subjected to the shading processing are an image hard to be read.

A second image 340 is shown in FIG. 8 as an example of an image generated by the warping processing.

The second image 340 is an image generated by applying the warping processing to the entire first image 310. The warping processing is processing for giving coordinates in an X-Y orthogonal coordinate system to the pixels forming the first image 310 and converting the coordinates. For example, a pixel in a coordinate (x, y) is mapped to another coordinate (x', y'). By performing this processing on all the pixels forming the first image 310 or a part of the pixels selected at an interval of predetermined pixels, the warping processing can be applied to the entire first image 310. In the warping processing, processing for moving coordinates of the pixels in an X-axis direction, processing for moving the coordinates of the pixels in a Y-axis direction, processing for moving the coordinates of the pixels in both of the X-axis direction and the Y-axis direction, and the like can be performed. The intensity of the warping processing increases and the visibility of the second image 340 deteriorated as the number of pixels, coordinates of which are converted, is larger and a movement amount of coordinates of the pixels is larger. The warping processing may be repeatedly applied to an image subjected to the warping processing. The warping processing includes processing called warp deformation processing and geometrical conversion processing.

A form of the second image 340 generated by the warping processing is an image distorted to form a wave or an image distorted to draw a swirl. The second image 340 shown in FIG. 8 is an image generated by applying the warping processing to the entire first image 310. The second image 340 is distorted to draw a swirl. The rectangles of the display objects 341 and 342 are deformed. The display object 343 is distorted to a degree unreadable as characters.

In this way, the personal computer 200 is capable of generating the second images 320, 330, and 340 generated by reducing readability of content such as characters. The personal computer 200 is capable of executing at least any one of the mosaic processing, the shading processing, and the warping processing explained above and may be capable of executing any two or more kinds of the processing selectively or in combination.

Further, the image processing section 218 may be configured to generate a plurality of second images having different visibilities. For example, the image processing section 218 may be configured to, when generating the second image 340 with the warping processing, continuously generate a plurality of second images 340 having different degrees of deformation by the warping processing. Similarly, about the shading processing and the mosaic processing, the image processing section 218 may be capable of generating pluralities of second images 320 and 330 having different sizes and colors of rectangles.

The second image is an image generated based on the first image, the image being obtained by reducing the visibility of the first image. It is more preferable that the second image is an image from which content of the first image can be estimated. In other words, it is preferable that the second image has not completely lost similarity to the first image. For example, the second image 320 is similar to the first image 310 in that the display objects 321 and 322 are the rectangles and in a positional relation between the display objects 321 and 322. The display object 323 cannot be read as characters. However, the user can recognize that the display object 323 is a character string. Therefore, viewing the second image 320, the user can estimate that the first image is the first image 310 and determine whether the first image 310 is an image suitable for display or an image not desired to be displayed.

The first image 310 is, for example, the projected image P projected onto the screen SC by the projector 100 based on a first image signal explained below. The second images 320, 330, and 340 are the projected image P projected onto the screen SC by the projector 100 based on a second image signal explained below.

1-5. Operation of the Projector

Figure 9:
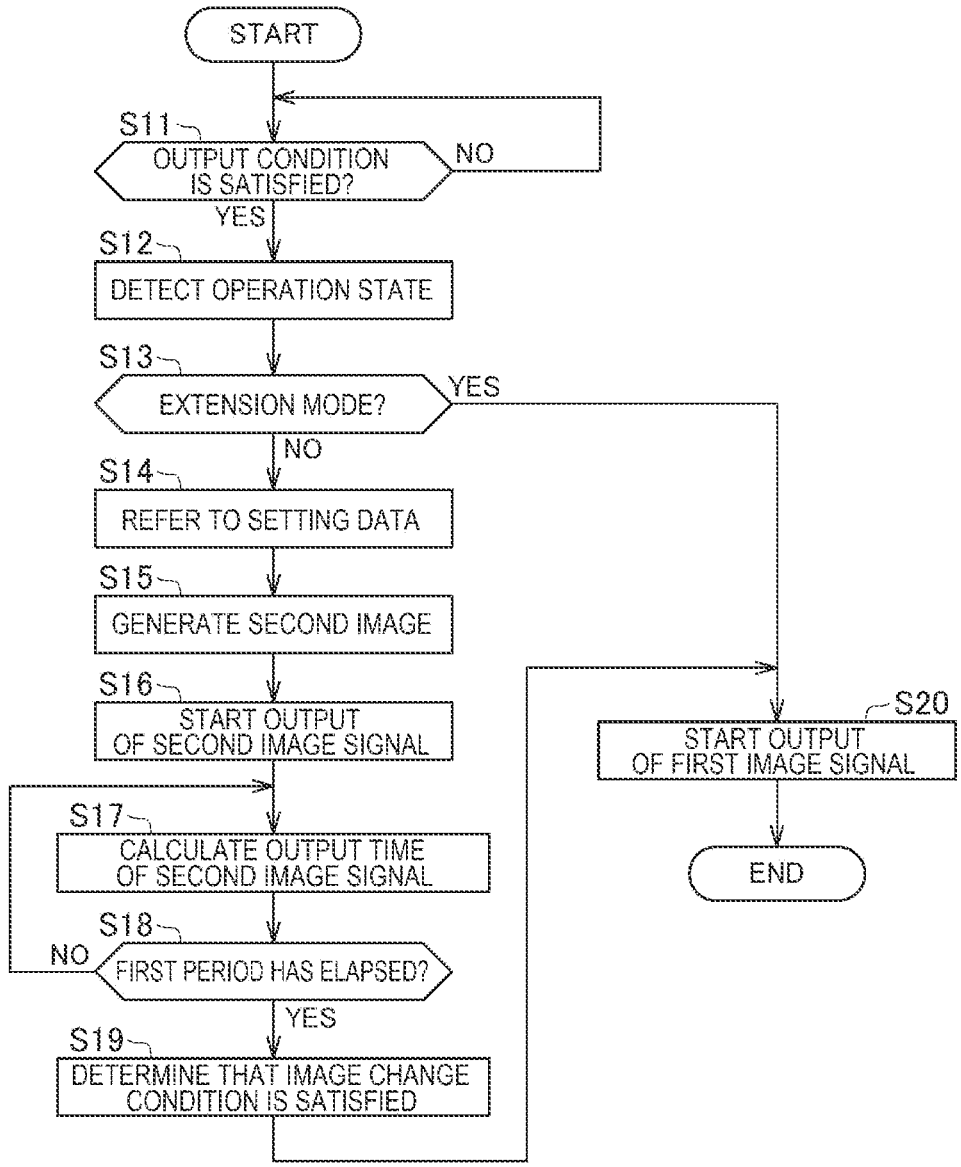
FIG. 9 is a flowchart showing the operation of the personal computer.

FIG. 9 is a flowchart showing the operation of the personal computer 200. Processing shown in FIG. 9 is executed by the second control section 210.

The second control section 210 determines whether an output condition is satisfied (step S11).

The output condition is that, for example, the output interface 234 is coupled to the display device. In this case, in step S11, the condition determining section 217 determines whether the display device is coupled to the output interface 234. The personal computer 200 can transmit and receive HDMI-CEC (Consumer Electronics Control) commands to and from the projector 100 via, for example, an HDMI cable. For example, the personal computer 200 may be capable of executing transmission and reception of control data via a USB cable or an Ethernet cable or wireless communication conforming to the Wi-Fi standard. With these communications, the condition determining section 217 can determine whether the projector 100 is coupled to the output interface 234.

The output condition may be that the output interface 234 starts the output of an image signal to the projector 100. In this case, the condition determining section 217 determines whether the output interface 234 has started the output of the image signal to the projector 100 with the function of the interface circuit of the output interface 234. This output condition is effective, for example, when the second control section 210 is configured to be capable of outputting the image signal with the output interface 234 before the output condition is satisfied. The image signal output by the output interface 234 before the output condition is satisfied is, for example, an image signal of the first image.

The output condition may be that the output interface 234 receives control data from the projector 100 coupled via the cable 10 or the like. For example, when the projector 100 starts display by the projecting section 110 based on the image signal output from the output interface 234, the projector 100 is capable of outputting, via the cable 10 or the like, control data indicating that the display is started. This configuration can be realized by, for example, the HDMI-CEC command explained above or transmission and reception of the control data via a USB cable or an Ethernet cable. In this case, the condition determining section 217 determines whether the output interface 234 has already received, from the projector 100, the control data indicating that the projector 100 has started the display.

When the personal computer 200 realizes, with the HDMI-CEC command explained above, the transmission and reception of the control data to and from the projector 100, the output interface 234 corresponds to an example of the receiving section.

When determining that the output condition is not satisfied (NO in step S11), the second control section 210 stays on standby until the output condition is satisfied.

When determining that the output condition is satisfied (YES in step S11), the second control section 210 detects an operation state of the personal computer 200 (step S12). The operation state of the personal computer 200 is, for example, a display mode and is, specifically, the mirroring mode and the extension mode.

The second control section 210 determines whether the display mode of the personal computer 200 is the extension mode (step S13). When determining that the display mode of the personal computer 200 is the extension mode (YES in step S13), the second control section 210 shifts to step S20 explained below.

When determining that the personal computer 200 is not in the extension mode (NO instep S13), the second control section 210 refers to the setting data 219 (step S14). In step S14, the second control section 210 acquires setting content concerning generation of the second image from the setting data 219.

The second control section 210 starts, according to the setting data 219, processing for generating the second image from the first image (step S15). The second control section 210 starts the output of a second image signal for displaying the second image from the output interface 234 (step S16). Consequently, the projector 100 starts display of the second image with the projecting section 110.

The second control section 210 calculates an elapsed time after the output of the second image signal is started in step S16 (step S17). The second control section 210 determines, based on the elapsed time calculated in step S17, whether a first period has elapsed after the output of the second image signal is started (step S18). When the first period has not elapsed (NO in step S18), the second control section 210 repeatedly performs the processing in step S17.

When the first period has elapsed (YES in step S18), the second control section 210 determines that the image change condition is satisfied (step S19). That is, in this embodiment, the image change condition is that the first period elapses after the output of the image signal of the second image is started. In this case, the second control section 210 shifts to step S20.

In step S20, the second control section 210 starts the output of a first image signal for displaying the first image. When the second image signal is output from the output interface 234, the second control section 210 switches the second image signal output from the output interface 234 to the first image signal. Consequently, the projector 100 displays the first image on the screen SC with the projecting section 110.

1-6. Action Effects of the First Embodiment

As explained above, the personal computer 200 according to this embodiment is the image supply device that outputs an image signal. The personal computer 200 includes the output interface 234 that outputs the image signal to the projector 100 different from the personal computer 200. The personal computer 200 includes the image processing section 218 that processes the first image and generates the second image obtained by reducing the visibility of the first image and the second control section 210. When the output condition, which is the first condition, is satisfied, the second control section 210 causes the output interface 234 to output the second image signal based on the second image. When the image change condition, which is the second condition, is satisfied, the second control section 210 causes the output interface 234 to output the first image signal based on the first image.

The display system 1 includes the projector 100 including the projecting section 110 that displays an image and the personal computer 200 that inputs an image signal corresponding to the first image to the projector 100. The personal computer 200 includes the output interface 234 that outputs the image signal to the projector 100. The personal computer 200 includes the image processing section 218 that processes the first image and generates the second image obtained by reducing the visibility of the first image and the second control section 210. When the output condition, which is the first condition, is satisfied, the second control section 210 causes the output interface 234 to output the second image signal based on the second image. When the image change condition, which is the second condition, is satisfied, the second control section 210 causes the output interface 234 to output the first image signal based on the first image.

With an image output method in the personal computer 200, the first image is processed and the second image obtained by reducing the visibility of the first image is generated. When the output condition, which is the first condition, is satisfied, the second image signal based on the second image is output by the output interface 234. When the image change condition, which is the second condition, is satisfied, the first image signal based on the first image is output by the output interface 234.

With the personal computer 200, the display system 1 including the personal computer 200, and the image output method in the personal computer 200, the following action effects are obtained. When the output condition is satisfied, the second image signal is output to the projector 100 to cause the projector 100 to display the second image obtained by reducing the visibility of the first image. Consequently, when the first image is an image not desired to be made public, it is possible to prevent the first image from being displayed. Since the second image is generated from the first image, the user can estimate content of the first image from the second image displayed by the projector 100. Accordingly, it is possible to determine, based on the second image, whether the first image is an image that may be made public.

The output condition may be that the second control section 210 determines that the projector 100 is coupled to the output interface 234. In this case, according to the connection of the projector 100 to the personal computer 200, the personal computer 200 outputs the second image signal to the projector 100. Therefore, according to the connection of the projector 100 to the personal computer 200, the projector 100 displays the second image having the reduced visibility. Therefore, it is possible to prevent an image not desired to be displayed from being clearly displayed.

The output condition may be that the second control section 210 determines that the output interface 234 has started the output of an image signal to the projector 100. In this case, according to the start of the output of the image signal to the projector 100, the second image signal is output to the projector 100. Therefore, according to the start of the output of the image signal by the personal computer 200, the projector 100 displays the second image having the reduced visibility. Consequently, it is possible to prevent an image not desired to be displayed from being clearly displayed.

The personal computer 200 may include the PC communication section 233 as the receiving section that receives a control signal from the projector 100. The output condition may be that, for example, the receiving section receives a control signal indicating that the projector 100 starts display based on the image signal output by the output interface 234.

In this case, according to the start of the display by the projector 100, it is possible to output the second image signal to the projector 100 and cause the projector 100 to display the second image having the reduced visibility. Accordingly, it is possible to prevent an image not desired to be displayed from being clearly displayed.

The image change condition is that, for example, the first period elapses after the output condition is satisfied. In this case, the first image is displayed when the first period elapses after the second image is displayed. The user only has to determine, within the first period, whether the first image may be displayed. When the first image is an image that may be displayed, the first image is displayed if the user waits until the first period elapses. Therefore, operation by the user is simple. When the first image is an image not desired to be displayed, the user only has to stop the display before the first period elapses. For example, if the user stops the display by the projector 100 or stops the signal output from the personal computer 200 to the projector 100, it is possible to prevent the first image from being displayed.

For example, the image processing section 218 applies the mosaic processing to the first image to thereby generate the second image. In this case, it is possible to easily generate, as the second image, an image obtained by reducing the visibility of the first image with the mosaic processing, the user being capable of estimating content of the first image from the image.

For example, the image processing section 218 applies the shading processing to the first image to thereby generate the second image. In this case, it is possible to easily generate, as the second image, an image obtained by reducing the visibility of the first image with the shading processing, the user being capable of estimating content of the first image from the image.

For example, the image processing section 218 applies the warping processing to the first image to thereby generate the second image. In this case, it is possible to easily generate, as the second image, an image obtained by reducing the visibility of the first image by deforming the first image, the user being capable of estimating content of the first image from the image.

The second control section 210 is capable of switching the operation state of the personal computer 200 to the first operation state and the second operation state. When the personal computer 200 is in the first operation state, the second control section 210 causes the output interface 234 to output the second image signal when the output condition is satisfied. When the personal computer 200 is in the second operation state, the second control section 210 causes the output interface 234 to output the first image signal without causing the output interface 234 to output the second image signal.

The first operation state of the personal computer 200 is, for example, the mirroring mode and the second operation state of the personal computer 200 is, for example, the extension mode. When the personal computer 200 is in the extension mode, an image output to the projector 100 by the personal computer 200 is an image different from an image displayed on the PC display section 232. Accordingly, it is highly likely that the first image is an image that may be displayed by the projector 100. In such a case, since the second control section 210 does not output the second image signal, there is an advantage that it is possible to cause the projector 100 to quickly display the first image.

2. Second Embodiment

Figure 10:
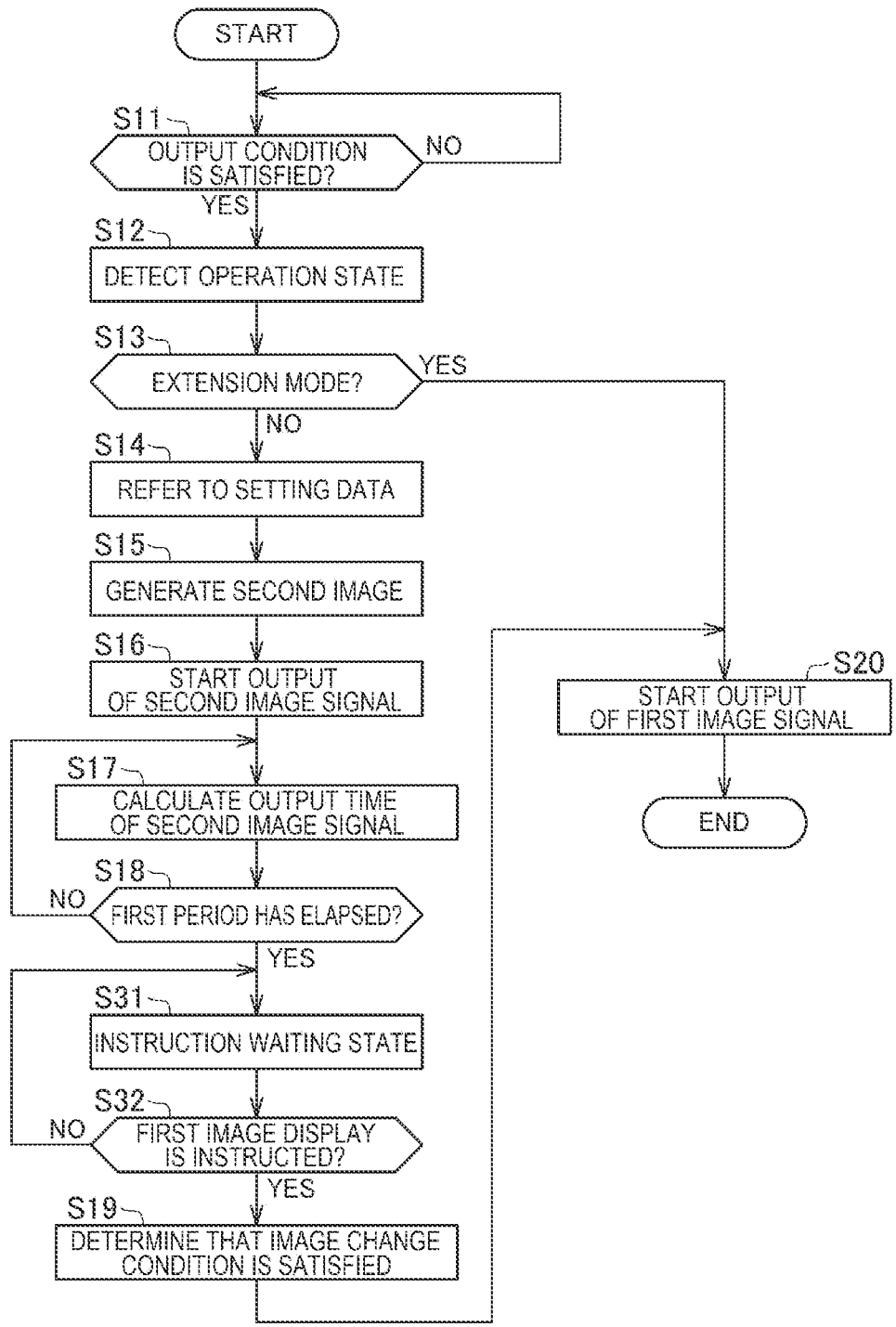
FIG. 10 is a flowchart showing the operation of a personal computer in a second embodiment.

FIG. 10 is a flowchart showing the operation of the personal computer 200 in a second embodiment to which the present disclosure is applied. In FIG. 10, processing common to FIG. 9 is denoted by the same step numbers and explanation about the processing is omitted.

The second embodiment is another operation example of the personal computer 200 explained in the first embodiment. Accordingly, since the configurations of the sections of the display system 1 in the second embodiment are common to the first embodiment, illustration and explanation about the configurations are omitted.

In the second embodiment, after determining instep S18 that the first period has elapsed (YES in step S18), the second control section 210 shifts to an instruction waiting state (step S31). In the instruction waiting state, the second control section 210 waits for, with the input section 231, operation for instructing to output the first image signal. The second control section 210 determines presence or absence of the operation for instructing to output the first image signal (step S32) and, while the relevant operation is absent (NO in step S32), continues the instruction waiting state in step S31. When receiving the operation for instructing to output the first image signal (YES in step S32), the second control section 210 determines in step S19 that the image change condition is satisfied.

That is, in the second embodiment, when the first period elapses after the output of the second image signal is started and when the operation for instructing to output the first image signal is performed, the second control section 210 determines that the image change condition is satisfied.

A reception section that receives operation by a user is not limited to the input section 231. That is, the second control section 210 is not limited to a configuration in which the input section 231 receives operation for instructing to display the first image. For example, the second control section 210 may detect, according to control data input to the personal computer 200 from the projector 100 via the cable 10, operation by the user for instructing to display the first image. In this case, the projector 100 only has to transmit the control data to the personal computer 200 according to operation received by the operation section 131 or the remote-controller-light receiving section 133. At this time, the operation section 131 and/or the remote-controller-light receiving section 133 or the output interface 234 that receives the control data is equivalent to the reception section.

As explained above, the personal computer 200 in the second embodiment includes the reception section that receives operation. The image change condition is that, after the first period elapses after the output condition is satisfied, the input section 231 further receives operation for instructing to output the first image signal. Consequently, after the first period elapses after the output condition is satisfied, when the input section 231 further receives the operation for instructing to output the first image signal, the second control section 210 causes the output interface 234 to output the first image signal.

With this configuration, while operation for instructing to display the first image is not performed, the display of the second image is continued by the projector 100 even if the first period elapses. Accordingly, when the first image is an image not desired to be displayed, it is possible to prevent the first image from being displayed. The user can cause the projector 100 to display the first image after confirming that the first image is not an image not desired to be displayed.

3. Third Embodiment

Figure 11:
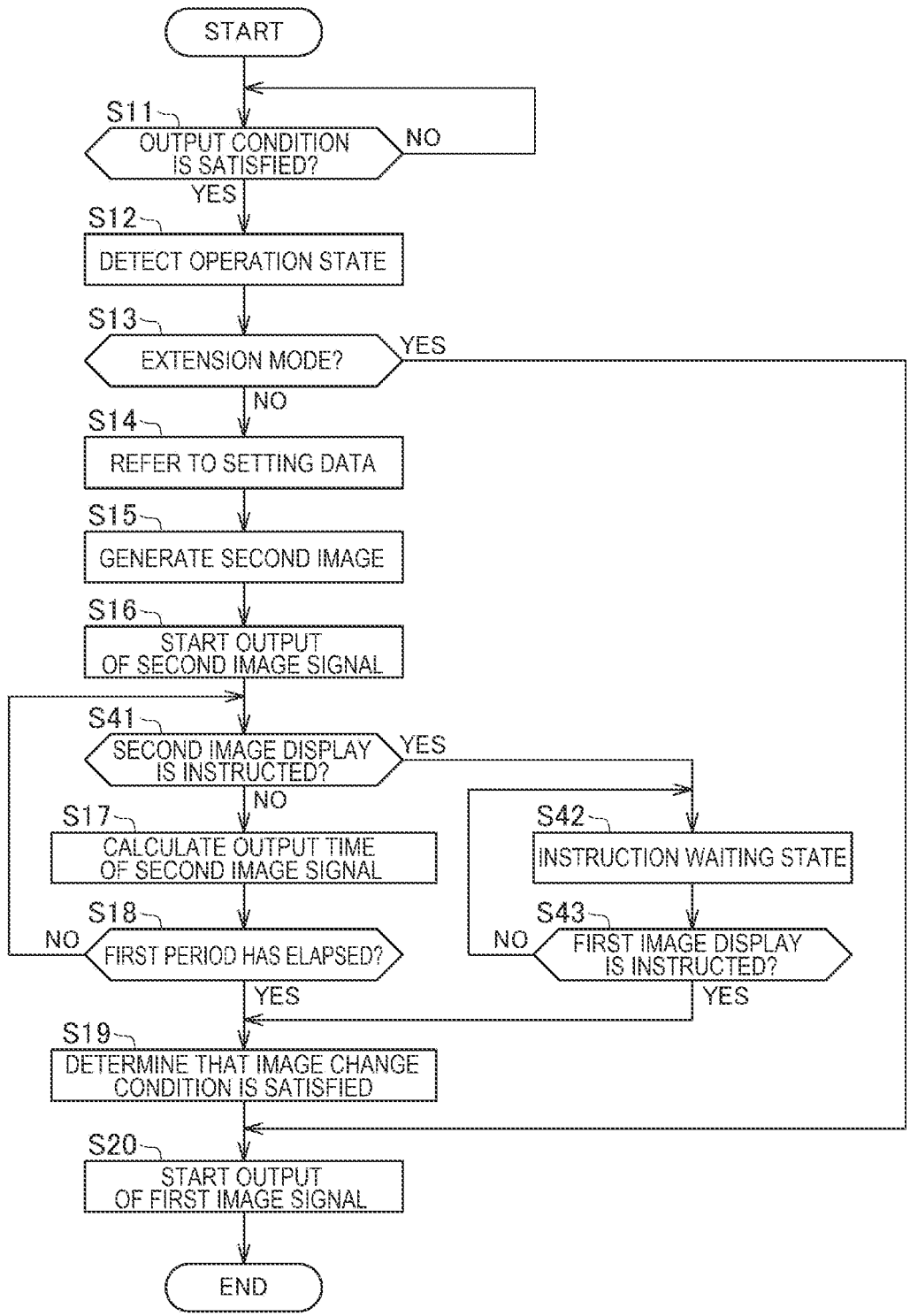
FIG. 11 is a flowchart showing the operation of a personal computer in a third embodiment.

FIG. 11 is a flowchart showing the operation of the personal computer 200 in a third embodiment to which the present disclosure is applied. In FIG. 11, processing common to FIG. 9 is denoted by the same step numbers and explanation of the processing is omitted.

The third embodiment is another operation example of the projector 100 explained in the first embodiment. Accordingly, the configurations of the sections of the display system 1 in the third embodiment are common to the first embodiment. Therefore, illustration and explanation about the configurations are omitted.

In the third embodiment, after starting the output of the second image signal in step S16, the second control section 210 determines whether operation for instructing to display the second image is performed (step S41). In step S41, the second control section 210 waits for, with the input section 231, operation for instructing to output the second image signal, that is, continue the output.

When the operation for instructing to output the second image signal is not performed (NO in step S41), the second control section 210 calculates an output time of the second image signal (step S17). The second control section 210 determines whether the first period has elapsed after the output of the second image signal is started (step S18). When the first period has not elapsed (NO in step S18), the second control section 210 returns to step S41.

When determining that the operation for instructing to output the second image signal is performed (YES in step S41), the second control section 210 shifts to an instruction waiting state (step S42). The instruction waiting state in step S42 is a state in which the second control section 210 waits for, with the input section 231, the operation for instructing to output the first image signal. In the instruction waiting state in step S42, the projecting section 110 continues the output of the second image signal.

The second control section 210 determines presence or absence of the operation for instructing to output the first image signal (step S43) and, while the relevant operation is absent (NO in step S43), continues the instruction waiting state in step S42. When receiving the operation for instructing to output the first image signal (YES in step S43), the second control section 210 determines instep S19 that the image change condition is satisfied.

That is, in the third embodiment, when the instruction to continue the output is performed after the output of the second image signal is started, the second control section 210 shifts to the instruction waiting state. In this case, the second control section 210 continues the output of the second image signal until the operation for instructing to output the first image signal is performed.

In the third embodiment, when the first period elapses while the instruction to continuously output the second image signal is not performed after the output of the second image signal is started, the second control section 210 determines that the image change condition is satisfied.

The reception section that receives the instruction to output the second image signal and the instruction to output the first image signal may be the projector 100 other than the input section 231. The output interface 234 that receives the control data from the projector 100 may function as the reception section.

As explained above, the personal computer 200 in the third embodiment includes the reception section that receives operation. When the first period elapses in a state in which the operation for instructing to output the second image signal is not received by the reception section after the output condition is satisfied, the second control section 210 determines that the image change condition is satisfied. When the operation for instructing to output the second image signal is received by the reception section before the first period elapses after the output condition is satisfied, the second control section 210 continues the output of the second image signal. Consequently, the personal computer 200 can execute the output of the second image signal even after the first period elapses and cause the projector 100 to display the second image according to operation by the user. When the first period elapses in a state in which the operation for instructing to continue the output of the second image signal is not received, the personal computer 200 can determine that the image change condition is satisfied and cause the projector 100 to display the first image.

Accordingly, even if the first period elapses, the user can continue the display of the second image by the projector 100 by operating the personal computer 200. Therefore, it is possible to prevent an image not desired to be displayed from being displayed. When confirming within the first period that the first image is not an image not desired to be displayed, the user can cause the screen SC to display the first image even if the user does not perform operation.

4. Other Embodiments

The embodiments explained above are preferred modes of implementation. However, the preferred modes of implementation are not limited to the embodiments. Various modified implementations are possible within a range not departing from the gist.

For example, in the embodiments, the personal computer 200 is configured to output the image signal to the projector 100, which projects an image onto the screen SC, and cause the projector 100 to display the first image and the second image. The display device is not limited to the projector 100 and may be a liquid crystal display that displays an image on a liquid crystal display panel. The display device may be a display device that displays an image on a plasma display panel or an organic EL (Electro Luminescence) panel. In this case, the liquid crystal display panel, the plasma display panel, or the organic EL panel corresponds to an example of the display section.

In the embodiments, as an example, the image supply device is the personal computer 200. However, the image supply device may be the image supply devices 21 and 22.

The personal computer 200 in the embodiments may use the PC communication section 233 as the reception section that receives operation. In this case, the PC communication section 233 may receive operation by wirelessly receiving control data including a command from a device such as a smartphone by wireless communication such as Wi-Fi.

The functional sections shown in FIGS. 2, 3, and 4 indicate functional components. Specific implementation forms are not particularly limited. For example, hardware individually corresponding to the functional sections does not always need to be implemented. It is also naturally possible to adopt a configuration in which one processor executes a program to realize functions of a plurality of functional sections. A part of the functions realized by software in the embodiment may be realized by hardware or a part of the functions realized by hardware may be realized by software. Besides, the specific detailed configurations of the other sections of the projector 100 can also be optionally changed in a range not departing from the gist.

The processing units of the flowcharts of FIGS. 9, 10, and 11 are divided according to the main processing contents in order to make it easy to understand the processing of the second control section 210. The processing units can also be divided into a larger number of processing units according to processing contents without being limited by the ways and the names of the divisions of the processing units shown in the flowcharts. The processing units can also be divided such that one processing unit includes a larger number of kinds of processing. The processing order of the flowcharts is not limited to the example shown in the figures.

A control method for the personal computer 200 can be realized by causing the processor 211 included in the personal computer 200 to execute a control program corresponding to the control method for the personal computer 200. The control program can also be recorded in a recording medium in which the control program is computer-readably recorded. The control method for the personal computer 200 can also be realized by storing the control program corresponding to the control method for the personal computer 200 in a server device or the like and downloading the control program from the server device to the personal computer 200.

What is claimed is:

1. An image supply device that outputs an image signal, the image supply device comprising:
   an interface circuit configured to output the image signal to a display device different from the image supply device;
   an integrated circuit configured to generate a second image obtained by reducing visibility of a first image; and
   a processor programmed to, when a first condition is satisfied, cause the interface circuit to output a second image signal based on the second image and, when a second condition is satisfied, cause the interface circuit to output a first image signal based on the first image,
   wherein the first condition is that the processor determines that the display device is coupled to the interface circuit, so that the second image signal based on the second image is directly output to the display device for display of the second image without any prior display of the first image,
   wherein the processor is further programmed for switching an operation state of the image supply device to a first operation state corresponding to a mirroring mode and a second operation state corresponding to an extension mode,
   wherein when the image supply device is in the first operation state, the processor causes the interface circuit to output the second image signal when the first condition is satisfied, and
   wherein when the image supply device is in the second operation state, the processor causes the interface circuit to output the first image signal without causing the interface circuit to output the second image signal.

2. The image supply device according to claim 1, further comprising a receiving section configured to receive a control signal from the display device, wherein
   the first condition is that the receiving section receives a control signal indicating that the display device starts display based on the image signal output by the interface circuit.

3. The image supply device according to claim 1, wherein the second condition is that a first period elapses after the first condition is satisfied.

4. The image supply device according to claim 1, further comprising a reception section configured to receive operation, wherein
   the second condition is that, after a first period elapses after the first condition is satisfied, the reception section further receives operation for instructing to output the first image signal.

5. The image supply device according to claim 1, further comprising a reception section configured to receive operation, wherein
   when a first period elapses in a state in which the reception section does not receive operation for inputting the output of the second image signal after the first condition is satisfied, the processor determines that the second condition is satisfied, and
   when the reception section receives operation for instructing to output the second image signal before the first period elapses after the first condition is satisfied, the processor causes the interface circuit to continue the output of the second image signal.

6. The image supply device according to claim 1, wherein the integrated circuit applies mosaic processing to the first image to thereby generate the second image.

7. The image supply device according to claim 1, wherein the integrated circuit applies shading processing to the first image to thereby generate the second image.

8. The image supply device according to claim 1, wherein the integrated circuit applies warping processing to the first image to thereby generate the second image.

9. The image supply device according to claim 1, further comprising a personal computer (PC) having a PC display section, and wherein
   the display device comprises a projector;
   the mirroring mode is an operation mode for causing the projector to display the same content as content displayed on the PC display section; and
   the extension mode is an operation mode causing the PC display section and the projector to display different content.

10. A display system comprising:
    a display device including a display section; and
    an image supply device configured to output an image signal to the display device, the image supply device including:
       an interface circuit configured to output the image signal to the display device;
       an integrated circuit configured to generate a second image obtained by reducing visibility of a first image; and
       a processor configured to, when a first condition is satisfied, cause the interface circuit to output a second image signal based on the second image and, when a second condition is satisfied, cause the interface circuit to output a first image signal based on the first image,
    wherein the first condition is that the processor determines that the display device is coupled to the interface circuit, so that the second image signal based on the second image is directly output to the display device for display of the second image without any prior display of the first image,
    wherein the processor is further programmed for switching an operation state of the image supply device to a first operation state corresponding to a mirroring mode and a second operation state corresponding to an extension mode,
    wherein when the image supply device is in the first operation state, the processor causes the interface circuit to output the second image signal when the first condition is satisfied, and
    wherein when the image supply device is in the second operation state, the processor causes the interface circuit to output the first image signal without causing the interface circuit to output the second image signal.

11. The display system according to claim 10, further comprising a personal computer (PC) having a PC display section, and wherein the display device comprises a projector;
    the mirroring mode is an operation mode for causing the projector to display the same content as content displayed on the PC display section; and
    the extension mode is an operation mode causing the PC display section and the projector to display different content.

* * * * *